US005730451A

United States Patent [19]

Walker

[11] Patent Number: 5,730,451

[45] Date of Patent: Mar. 24, 1998

[54] MIRACLE TOP GARBAGE CART

[76] Inventor: Lawrence Walker, 157 Herbert Ave., Elmont, N.Y. 11003

[21] Appl. No.: 614,006

[22] Filed: Mar. 11, 1996

[51] Int. Cl.[6] ..... B62B 1/16

[52] U.S. Cl. ..... 280/47.26; 220/331; 220/379; 220/908

[58] Field of Search ..... 220/329, 331, 220/345, 346, 347, 379, 908; 280/47.26, 79.5

[56] References Cited

U.S. PATENT DOCUMENTS

| | | | |
|---|---|---|---|
| 1,178,480 | 4/1916 | Marx | 220/331 |
| 2,304,898 | 12/1942 | Dukehart, Jr. | 220/331 |
| 2,661,119 | 12/1953 | Spiess, Jr. et al. | 220/331 |
| 2,804,230 | 8/1957 | Attias et al. | 220/331 |
| 2,979,223 | 4/1961 | Rideout | 220/331 |
| 4,158,421 | 6/1979 | Chi | 220/331 X |
| 4,889,257 | 12/1989 | Steffes | 220/331 |
| 4,989,746 | 2/1991 | Pierce | 220/331 X |
| 5,582,322 | 12/1996 | Prout et al. | 220/908 X |

FOREIGN PATENT DOCUMENTS

| | | | |
|---|---|---|---|
| 546337 | 11/1922 | France | 220/331 |

*Primary Examiner*—Brian L. Johnson
*Assistant Examiner*—Michael Mar
*Attorney, Agent, or Firm*—Michael I. Kroll

[57] ABSTRACT

A miracle top garbage cart (10) which comprises a container (12) having an open top (14) for the insertion and removal of garbage. A lid (16) covers the open top (14) of the container (12). A structure (18) is for retaining the lid (16) to the open top (14) of the container (12). This allows the lid (16) to slide across the open top (14) and then swing down to an open position and then swing up and slide back on the open top (14) to a closed position, so that the lid (16) will never be removed from the container (12) to get lost and damaged.

7 Claims, 2 Drawing Sheets

Fig. 1
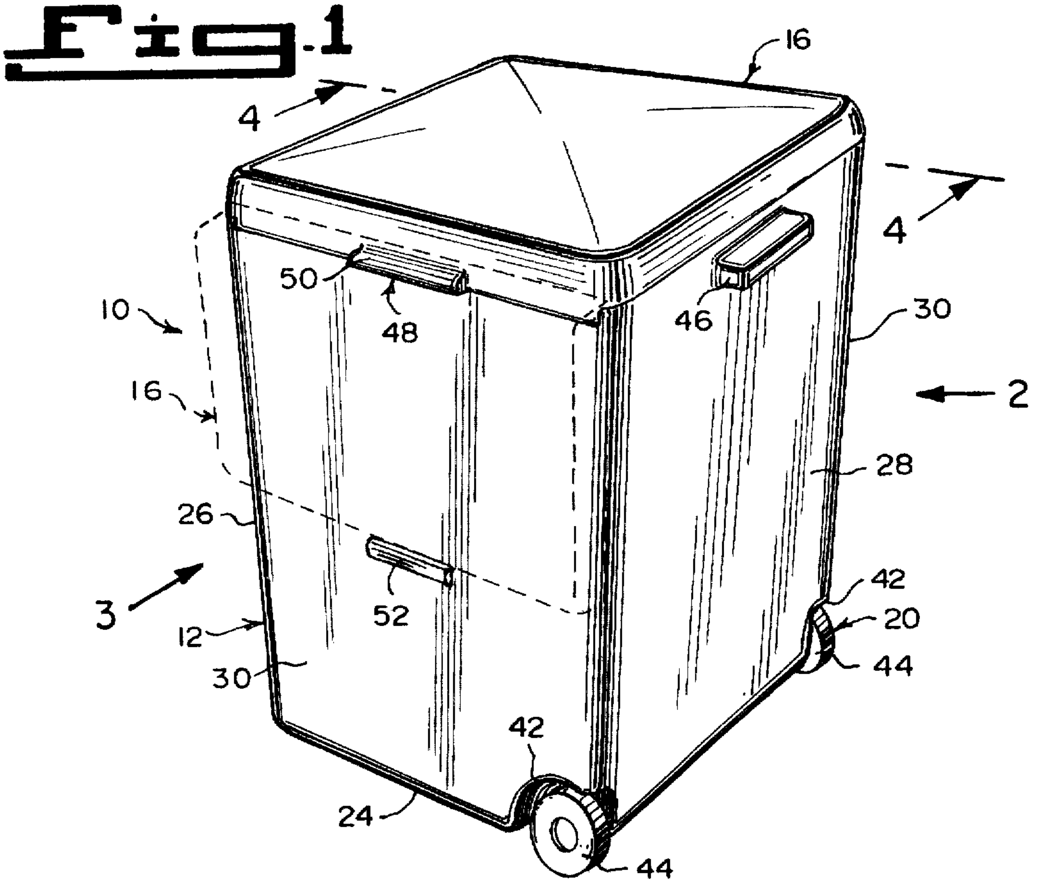
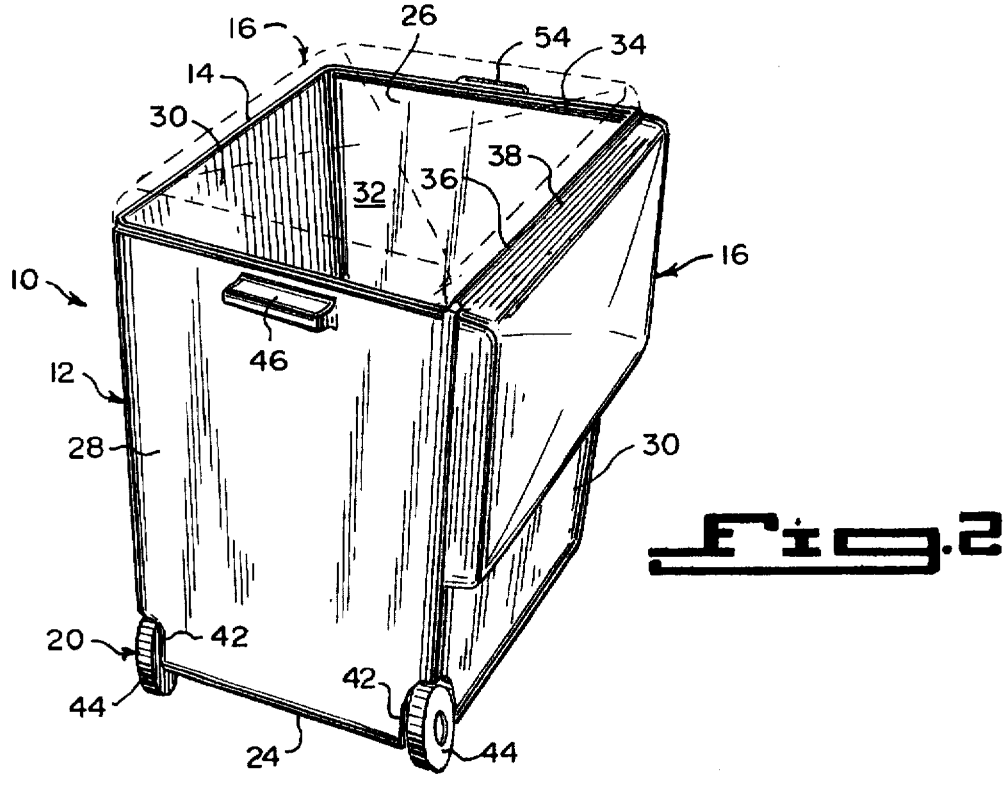
Fig. 2

MIRACLE TOP GARBAGE CART

BACKGROUND OF THE INVENTION

1. Field of the Invention

The instant invention relates generally to trash receptacles and more specifically it relates to a miracle top garbage cart.

2. Description of the Prior Art

Numerous trash receptacles have been provided in prior art that are adapted to contain removable covers which can get damaged or lost during continuous usage. While these units may be suitable for the particular purpose to which they address, they would not be as suitable for the purposes of the present invention as heretofore described.

SUMMARY OF THE INVENTION

A primary object of the present invention is to provide a miracle top garbage cart that will overcome the shortcomings of the prior art devices.

Another object is to provide a miracle top garbage cart in which the lid slides in a track over a container and then swings down to open and is retained thereto by a latch, so that the lid can never be removed therefrom.

An additional object is to provide a miracle top garbage cart whereby the lid will always be connected to the container, so that it will not get lost or misplaced, when opened and closed on the container.

A further object is to provide a miracle top garbage cart that is simple and easy to use.

A still further object is to provide a miracle top garbage cart that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of the instant invention with the lid in a closed position.

FIG. 2 is a perspective view taken in the direction of arrow 2 in FIG. 1, with the lid in an opened position.

Similar reference characters denote corresponding features consistently throughout the attached drawings.

DETAILED DESCRIPTION OF THE PREFERRED EMBODIMENTS

Figure 3:
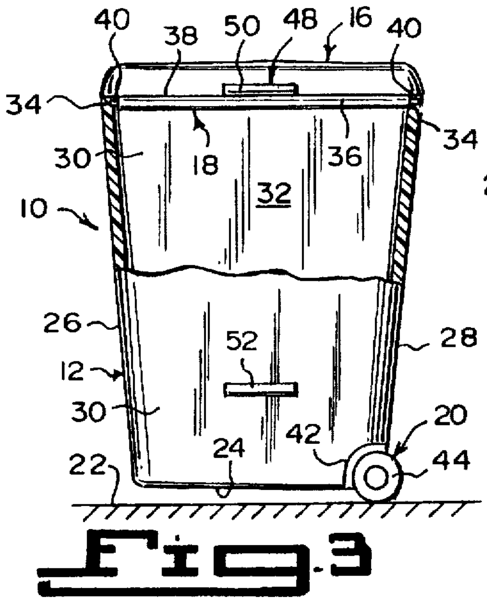
FIG. 3 is a side view taken in the direction of arrow 3 in FIG. 1, with parts broken away and in section.
Figure 4:
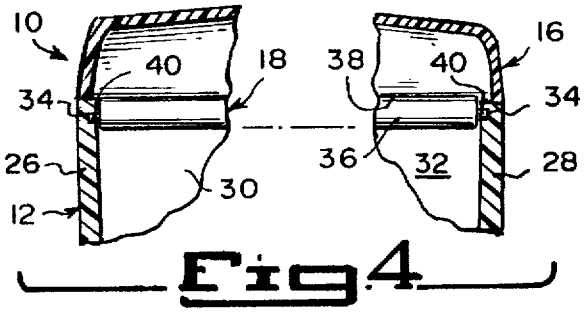
FIG. 4 is a cross sectional view taken along line 4—4 in FIG. 1, with parts broken away.
Figure 5:
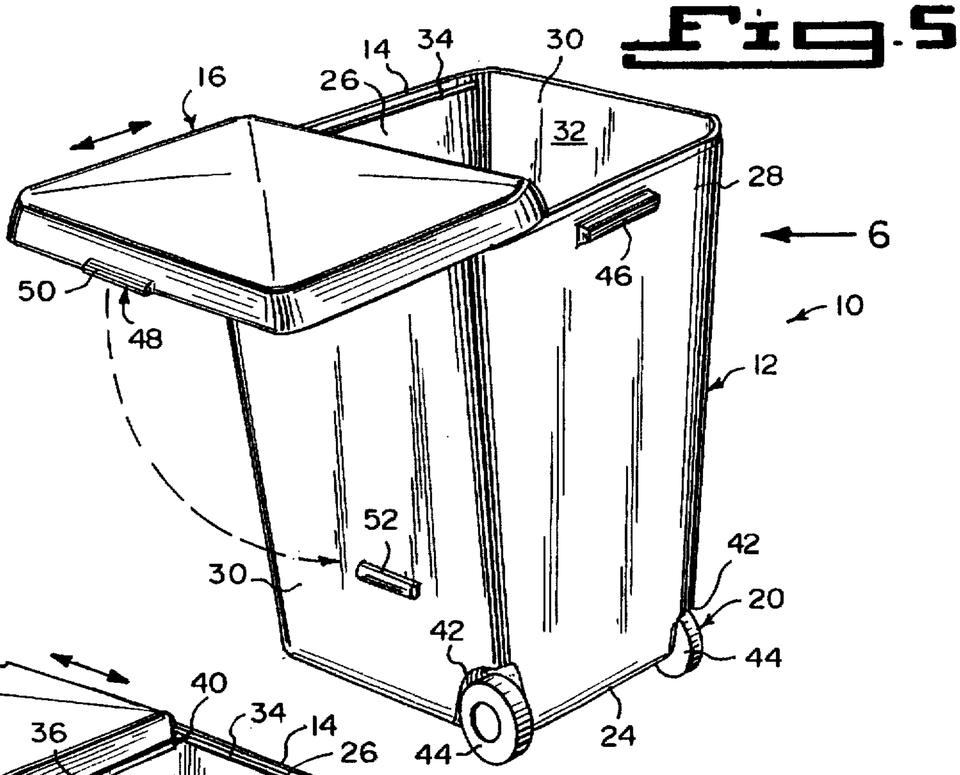
FIG. 5 is a side perspective view similar to FIG. 1, with the lid partly opened.
Figure 6:
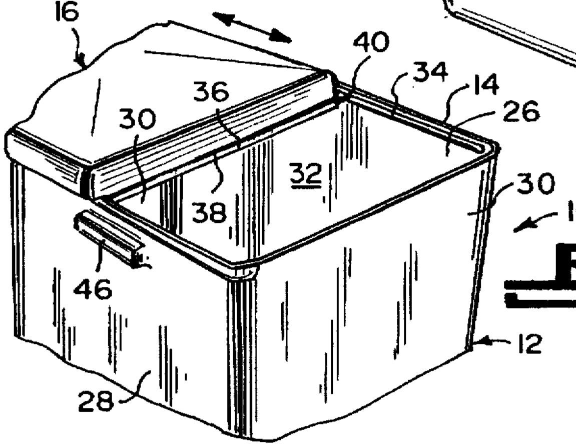
FIG. 6 is a perspective view taken in the direction of arrow 6 in FIG. 5, with parts broken away and the lid partly opened.

Turning now descriptively to the drawings, in which similar reference characters denote similar elements throughout the several views, FIGS. 1 through 6 illustrate a miracle top garbage cart 10, which comprises a container 12 having an open top 14 for the insertion and removal of garbage. A lid 16 covers the open top 14 of the container 12.

A structure 18 is for retaining the lid 16 to the open top 14 of the container 12. This allows the lid 16 to slide across the open top 14 and then swing down to an open position and then swing up and slide back on the open top 14 to a closed position, so that the lid 16 will never be removed from the container 12 to get lost and damaged. A facility 20 is for moving the container 12 with the lid 16 along a generally flat horizontal surface 22, as shown in FIG. 3.

The container 12 includes a bottom wall 24 with a front wall 26 that extends upwardly from the bottom wall 24. A rear wall 28 extends upwardly from the bottom wall 24. A pair of side walls 30 are also provided, with each extending upwardly from the bottom wall 24 between the front wall 26 and the rear wall 28, to form a compartment 32 therein to receive the garbage deposited through the open top 14.

The front wall 26, the rear wall 28 and the side walls 30 that extend upwardly from the bottom wall 24 are at an angle outwardly from the bottom wall 24. The open top 14 of the container 12 is larger than the bottom wall 24, to permit easier insertion and removal of the garbage into and from the compartment 32 of the container 12.

The retaining structure 18 consists of the container 12 having a pair of opposite horizontal grooves 34. Each groove 34 is formed within the container 12 near the open top 14. A pivot rod 36 is affixed to one edge 38 of the lid 16.

A pair of short shafts 40 are provided. The short shafts 40 extending from opposite ends of the pivot rod 36 will slide within the grooves 34, until the lid 16 completely overhangs the container 12 to allow the pivot rod 36 to rotate and swing the lid 16 down into the open position. Later, the lid 16 can swing up and the short shafts 40 slide back in the grooves 34, to allow the lid 16 to go back into the closed position.

The moving facility 20 includes the container 12 having a pair of wheel wells 42 formed at lower rear corners thereof. A pair of wheels 44 are provided. Each wheel 44 is rotatively mounted, within one wheel well 42. A pull handle 46 is located on the container 12 above the wheels 44. A person can grasp the pull handle 46, tilt the container 12 rearwardly to move the wheels 44 along the generally flat horizontal surface 22.

The miracle top garbage cart 10 further contains a latch mechanism 48. A first segment 50 of the latch mechanism 48 is on the lid 16 opposite from the retaining structure 18. A second segment 52 of the latch mechanism 48 is on the container 12. When the lid 16 is in the open position, the first segment 50 of the latch mechanism 48 will engage with the second segment 52 of the latch mechanism 48, to keep the lid 16 in the open position against the container 12.

A carry handle 54, as shown in FIG. 2, is located on the container 12 opposite from the pull handle 46. A person can grasp both the pull handle 46 and the carry handle 54, so as to lift the container 12 off of the generally flat horizontal surface 22.

The container 12 and the lid 16 are both fabricated out of a strong durable material 56. The strong, durable material 56 is plastic. The lid 16 can be mounted over the open top 14 of the container 12, so that it can go into the open position on either side wall 30, making it useful for either a left or right handed person.

LIST OF REFERENCE NUMBERS

| | |
|---|---|
| 10 | miracle top garbage cart |
| 12 | container of 10 |
| 14 | open top of 12 |
| 16 | lid of 10 |
| 18 | retaining structure of 10 |
| 20 | moving facility |
| 22 | generally flat horizontal surface |
| 24 | bottom wall of 12 |
| 26 | front wall of 12 |
| 28 | rear wall of 12 |
| 30 | side wall of 12 |
| 32 | compartment in 12 |
| 34 | horizontal groove in 12 |
| 36 | pivot rod on 38 of 18 |
| 38 | edge of 16 |
| 40 | short shaft on 36 |
| 42 | wheel well in 12 |
| 44 | wheel of 20 |
| 46 | pull handle on 12 |
| 48 | latch mechanism |
| 50 | first segment of 48 on 16 |
| 52 | second segment of 48 on 12 |
| 54 | carry handle on 12 |
| 56 | strong, durable material (plastic) for 12 and 16 |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A miracle top garbage cart which comprises:

a) a container having a rectangular open top for the insertion and removal of garbage and comprising a bottom wall, a front wall extending upwardly from said bottom wall, a rear wall extending upwardly from said bottom wall, and a pair of side walls each extending upwardly from said bottom wall between said front wall and said rear wall to form a compartment to receive garbage with said rectangular open top through which said garbage is deposited, said front, rear and side walls having co-planar top edges:

b) a lid to cover the open top of said container having straight sides aligned and flush with said container walls and co-planar bottom edges thereof in contact with said top edges;

c) means for retaining said lid to the open top of said container comprising a pair of opposite horizontal grooves in said side walls within said container adjacent the open top thereof, a horizontal pivot rod affixed to a first edge of said lid and depending downwardly therefrom, and a pair of short shafts extending from opposite ends of said pivot rod into said grooves for allowing said lid to slide across and above the open top and then swing down around said pivot rod to a position against said front wall to an open position and then swing up and slide back on the open top to a closed position; and d) latch means for securing said lid to said container when said lid is in the open position comprising a first latch segment mounted on the outside of the front wall of said container and an engageable second latch segment mounted on a second edge of said lid opposite said first edge for engaging said first latch segment when said lid is adjacent the front wall of said container so that said lid is always secured to said container.

2. The garbage cart as recited in claim 1 further including means for moving said container with said lid along a generally flat horizontal surface.

3. The garbage cart as recited in claim 1 wherein said front wall, said rear wall and said side walls extend upwardly from said bottom wall at an angle outwardly from said bottom wall.

4. The garbage cart as recited in claim 2 wherein said moving means includes said container having a pair of wheel wells formed at lower rear corners thereof, a pair of wheels, in which each said wheel is rotatively mounted within one said wheel well, and a pull handle located on said container above said wheels so that a person can grasp said pull handle, and tilt said container rearwardly to move said wheels along the generally flat horizontal surface.

5. The garbage cart as recited in claim 4 further including a carry handle located on said container opposite from said pull handle, so that a person can grasp both said pull handle and said carry handle, so as to lift said container off of the generally flat horizontal surface.

6. The garbage cart as recited in claim 1 wherein said container and said lid are both fabricated out of a strong, durable material.

7. The garbage cart of claim 6 wherein said material is plastic.

* * * * *